Feb. 27, 1940.  B. C. PLACE  2,191,773
FASTENER
Filed Dec. 8, 1937
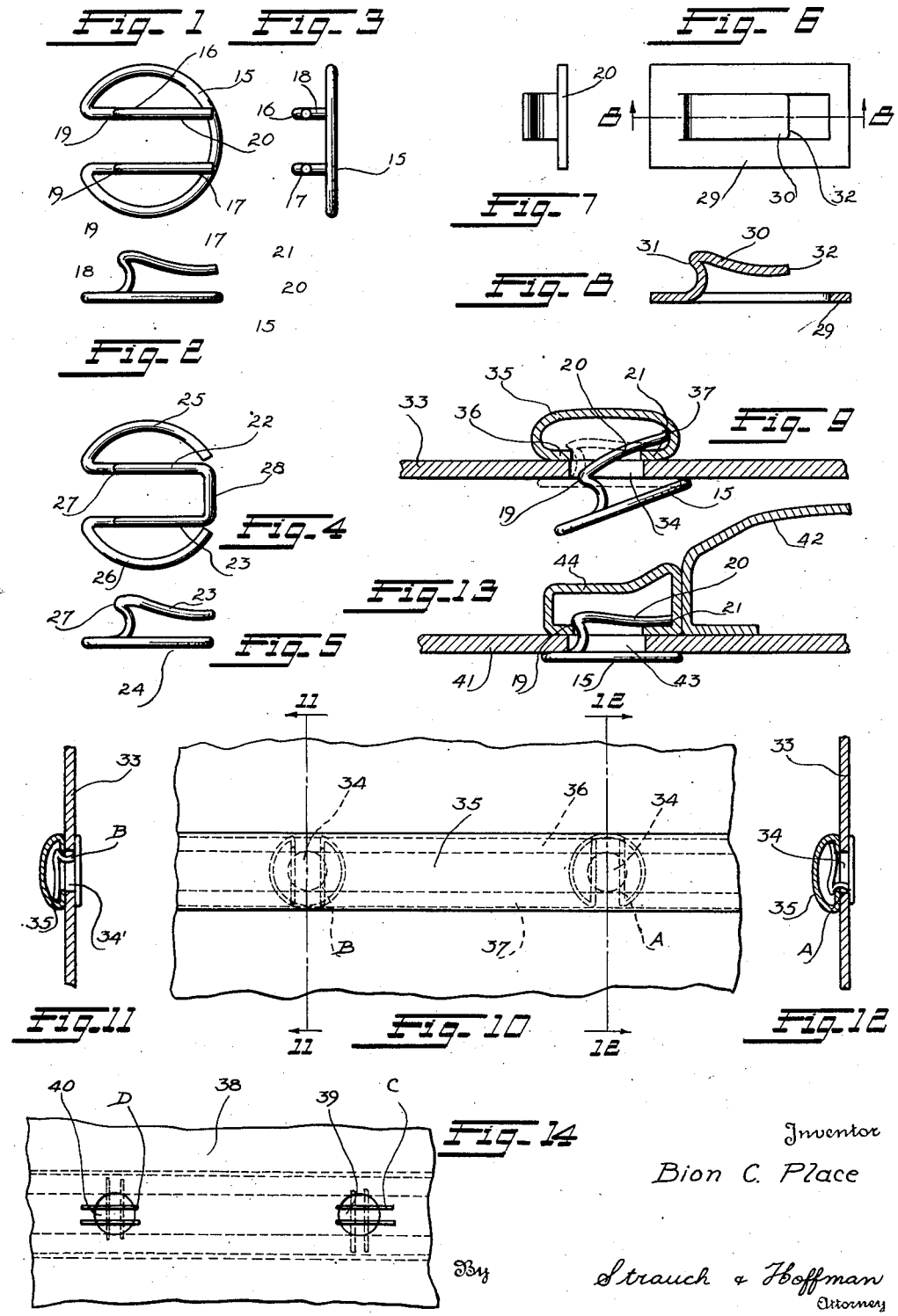
Inventor
Bion C. Place
By Strauch & Hoffman
Attorneys Patented Feb. 27, 1940

2,191,773

UNITED STATES PATENT OFFICE 2,191,773

FASTENER

Bion C. Place, Detroit, Mich., assignor of one-half to George E. Gagnier, Detroit, Mich.

Application December 8, 1937, Serial No. 178,805

10 Claims. (Cl. 189—88)

The present invention relates to spring fasteners particularly designed for the purpose of securing hollow moldings, or like trim strips, upon a supporting structure in a manner exerting a yielding pressure upon the molding tending to maintain it in snug contact with said structure.

The primary purpose of the present invention is to provide a simple spring fastener capable of being snapped into holding position from the side of the supporting structure, opposite from that against which the molding rests, and which fastener possesses a flat head which, in holding position, lies in contact with the underside of the supporting structure.

Still another object of the present invention is to provide a spring fastener for securing moldings, the holding elements of which are disposed close to the head of the fastener adapting the fastener for use in securing moldings of small height without substantial projections from the supporting structure, but which fastener nevertheless possesses the characteristic of exerting a firm pressure upon the molding holding it from movement in any direction and yieldingly pressing it against the structure to which it is secured.

A still further object of the invention is to provide a spring fastener of hook-like formation formed to be hooked upon one of the flanges of a hollow molding through an opening in the supporting structure, and formed so as to provide a shoulder at the rear of the hook formation, which is arranged to be sprung past the edge of the other flange of said molding, thus preventing disengagement of the hook formation.

Still another object of the present invention is to provide an improved spring fastener to effectively secure hollow moldings or like trim strips upon a supporting structure by using the fasteners of hook-like formation in cooperating pairs, one fastener of each pair being hooked upon one flange of the molding, while the other fastener of the pair is hooked in the opposite direction upon the other flange of the molding.

A still further object of the invention is to provide a spring fastener, having holding elements of very short length from the head thereof, that is capable of being constructed inexpensively from a single piece of spring wire or a small blank of sheet metal.

Still further objects of the invention will appear as the description thereof proceeds with reference to the accompanying drawing in which:

Figures 1, 2 and 3 are respectively plan, side and end views of a preferred form of fastener of the present invention, constructed from a single piece of wire, the head of the fastener being formed from the mid-portion of the wire while the holding elements of the fastener are formed from the ends thereof.

Figures 4 and 5 are respectively plan and side views of a modified form of fastener, likewise constructed of wire, but in which the holding elements are formed from the mid-portion of the wire, while the ends thereof are utilized in the formation of the head thereof.

Figures 6, 7 and 8 are respectively plan, end and a longitudinal sectional view, on the plane indicated by the line 8—8 in Figure 6, of a further modified form of fastener constructed from a sheet metal blank in a manner to accomplish the purposes of the present invention.

Figure 9 is a fragmental sectional view showing the first steps in the preferred way of using the fastener of the present invention in securing a hollow molding upon a supporting structure.

Figure 10 is a fragmental plan view showing a section of a hollow molding secured in place by its pair of cooperating fasteners corresponding to the present invention.

Figure 11 is a sectional view taken on the plane indicated by the line 11—11 in Figure 10 looking in the direction of the arrows.

Figure 12 is a sectional view taken on the plane indicated by the line 12—12 in Figure 10 looking in the direction of the arrows.

Figure 13 is a fragmental sectional view showing how the fastener of the present invention may be used singly in securing a hollow finishing molding in a corner.

Figure 14 is a fragmental plan view showing a supporting structure having a pair of the fasteners of the present invention in position to receive a hollow molding, illustrated in dotted lines in said figure, thereover and to be subsequently returned to the dotted line position to secure the molding upon said structure.

Like reference characters indicate like parts throughout the several figures.

Referring to Figures 1, 2 and 3 of the drawing the fastener therein illustrated includes a head 15 in the form of an open loop. The fastener also includes holding elements in the form of two bent arms 16 and 17. The head 15 is formed, as illustrated, from the mid-portion of the single piece of wire, while the bent arms 16 and 17 are formed from the ends thereof. Each arm 16 and 17 consists of a portion 18, disposed approximately normal to the plane of the head 15, bent so as to provide a shoulder 19 spaced inwardly of the head 15. Each arm 16 and 17 also includes a portion 20 extending away from the shoulder 19 and spaced from the plane of the head 15 a distance approximating that of the spacing of the shoulder 19 from said head. The portion 20 is curved downwardly toward the head and the extreme end preferably slightly curved away from said head for the purpose presently to be described. The end 21 of each portion 20 provides an abutment for a purpose hereinafter referred to.

If desired, the equivalent of the fastener illustrated in Figures 1, 2 and 3 may be constructed in a manner illustrated in Figures 4 and 5, in which the holding elements of the fastener 22 and 23 are formed from the mid-portion of the single piece of wire, while the head 24 is constructed in two sections 25 and 26 which are the ends of the piece of wire preferably bent to form an open loop. In this form of the invention holding shoulders 27 are provided on the holding elements 22 and 23, which are connected together by a portion 28, the edge of which provides a single abutment corresponding to the abutments 21 on the arms of the fastener first described.

While the heads of the two forms of fasteners already described are illustrated in circular outline, it is to be understood that the shape of said heads may be varied and may assume any other form.

Referring to Figures 6, 7 and 8 a fastener is illustrated constructed from a rectangular piece of sheet metal 29, the body of which constitutes the head of the fastener. A long tongue 30 is separated from the body of the blank, by a U-shape cut, and said tongue is bent out of the plane of the blank providing the holding element, which in this form of the invention is a single tongue, a portion of which extends normal to the plane of the blank and is provided with a shoulder 31 spaced from the head. The other portion of the tongue is bent away from the shoulder 31 and curved, as illustrated, to provide a tongue generally paralleling the head and yieldable in a direction normal to the plane of said head. The end of the tongue 32 provides an abutment for a purpose corresponding to like abutments already referred to in connection with the other forms of the invention.

While a sheet metal fastener having a rectangular head is illustrated in Figures 6, 7 and 8, it will be understood that the outline of the head may assume any form. Furthermore, while a single tongue is illustrated in this form of the invention it will be readily apparent that two separate tongues, providing arms, may be separated from the body of the sheet metal blank, instead of the single tongue that is illustrated, such tongues, providing the fastener with a higher degree of flexibility.

The fastener, various forms of which have already been described, is peculiarly useful in securing hollow moldings upon metallic or like supporting structures. Such moldings are widely used in finishing automobiles, for example, and the fasteners of this invention may be conveniently applied to the securing of moldings for such purpose. A preferred way of securing the molding upon a supporting structure is illustrated in Figure 9, in which 33 designates a sheet metallic or like supporting structure having an opening 34 therein. A hollow molding 35 is disposed upon said supporting structure, said molding having inturned flanges 36 and 37 that are relatively widely spaced apart. Such moldings are well known in the art. Preferably the opening 34 is made of a diameter corresponding to the spacing between the edges of the flanges 36 and 37.

In applying the molding to the supporting structure 33 the rear side, of course, must be accessible for the application of the fastener presently to be referred to. The molding is disposed over the opening 34 with the edges of the flanges 36 and 37 aligned with the edges of the opening, which may be circular or rectangular as desired. In securing the molding upon the supporting structure each fastener is tilted as illustrated in Figure 9, the portion 20 of each arm or holding element being bent, if necessary, to permit said portion to be brought into lapped engagement upon one of the inturned flanges of the molding. The curved ends of the latter portion facilitate such engagement. Pressure is then exerted against the head of the fastener forcing the shoulder past the other flange 36 of the molding until the fastener reaches the dotted line position illustrated in Figure 9. The portion of the arms, that carry the shoulder 19, are flexed during the operation of snapping the fastener into its final holding position. In such position, the arm portions 20 bear yieldingly, but firmly, against the flange 37, while the abutment 21 of the end of each of said arm portions bears firmly against the wall of the molding that extends transversely of the flanges, that is, the side wall of the molding. In said position, further, the shoulder 19 overlaps the flange 36 and bears firmly, but yieldingly, against the edge thereof, such firm engagement being maintained by engagement of the abutments 21 at the end of the arms 20 at the side wall of the molding as just stated. Thus in holding position the fastener exerts a yielding pressure causing the molding to bear firmly against the supporting structure 33, and it exerts a yielding pressure transverse to the length of the molding insuring an entire absence of play or movement between the molding and the fastener, or between the molding and the supporting structure, thus avoiding rattles or squeaks when the moldings constitute a part of the finish of an automobile.

It is necessary in securing moldings, such as illustrated in Figure 9, by means of fasteners of the present invention, that the fasteners be applied in pairs, or at least that some of the fasteners be hooked upon or engaged with one of the flanges in one direction, while others of the fasteners be engaged on the other flange by hooking in the opposite direction, since it is apparent from a consideration of Figure 9 that, when a single fastener is in holding position, the molding in the fastener can be shifted bodily in the opening 34 in the supporting structure. To maintain the molding from shifting in any direction with respect to the opening in the supporting structure, certain of the fasteners are applied in the opposite direction as is illustrated in Figures 10, 11 and 12 of the drawing.

Referring to these figures, it will be observed that the fastener A at the right of Figure 10 and in Figure 12 is hooked upon the flange 36 of the molding 35, whereas the fastener B, at the left of Figure 10 and in Figure 11, is hooked upon the flange 37 of the molding 35. By using the fasteners of the present invention in the manner just stated, it will be observed that shifting the molding on the supporting structure is positively prevented by cooperation of adjacent oppositely applied fasteners.

If desired, the fasteners may be first applied to the supporting structure and the molding subsequently disposed over the fasteners, and the latter then turned into holding position, instead of proceeding as already described by first hooking the fasteners on one of the flanges of the molding and then bringing the holding shoulder on each arm into snap engagement with the edge of the other flange of the molding. The alternative arrangement is illustrated in Figure 13 which shows a supporting structure 38 provided with aligned openings 39 and 40 in which are disposed two fasteners of the kind illustrated in Figures 1, 2 and 3, and designated as fasteners C and D. The holding arms of the fastener C are directed to the right of the opening 39 while the holding arms of the fastener D are directed to the left of the opening 40. In securing a molding to such structure the molding is applied over the fasteners already assembled with respect to the supporting structure, as illustrated in dotted lines in said figure. The molding is then secured by turning the fasteners C and D clockwise through an angle of 90 degrees, such turning of the fasteners bringing the portions 20 and shoulders 19 into engagement with the opposite inturned flanges. The fasteners in assembled position occupy exactly the same position with respect to the molding and supporting structure, as occupied by fasteners when applied in the manner first described.

It is to be understood that the removal of a molding held by fasteners of the present invention, applied in either of the manners already described, may be readily accomplished by first turning the fasteners, the holding shoulders and holding arms from the molding thus bringing the fasteners into the position illustrated in Figure 13. The molding can then be lifted away from the supporting structure and a new molding applied by again turning the fasteners into their holding positions, after the new molding has been disposed over the openings and the fasteners disposed therein.

The fastener of the present invention is well adapted to secure so-called corner moldings firmly in position. Such an arrangement is illustrated in Figure 14 of the drawing in which a molding 44 is secured in a corner between two supporting elements 41 and 42, by means of a fastener passed through an opening 43 in the structure 41. When the fastener of the present invention is used in the manner illustrated in this figure it will be understood that all of the fasteners may be applied in the same way. The abutment 21 and the end of the arms engage the side wall of the molding adjacent the element 42 urging the molding firmly into the corner. The fasteners, it will be observed, yieldingly hold the corner molding in place with an entire absence of play between the molding, the fasteners and either supporting element, or any two of them, thus insuring satisfactory attachment of the molding.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination, a supporting structure having an opening, a hollow molding having inturned spaced flanges disposed on one side of said structure over said opening, and a spring fastener securing said molding to said structure consisting of a flat head bearing against the other side of said structure, and a pair of arms carried by said head and each including a portion passing through said opening and having a shoulder overhanging an edge of one of said flanges and another portion extending away from said shoulder and bearing against the other of said flanges, each arm abutting against a wall of said molding disposed transversely of said flanges to maintain said shoulder in contact with said first named flange.

2. In combination, a supporting structure having an opening, a hollow molding having inturned spaced flanges disposed on one side of said structure over said opening, and a spring fastener securing said molding to said structure consisting of a flat head bearing against the other side of said structure, and means carried by said head providing a shoulder that may be sprung past an edge of one of said flanges and further means carried by said last named means to yieldingly contact with the inside of the other flange of said molding and abut against a wall thereof disposed transversely to said flanges to maintain said shoulder in engagement with said first named flange.

3. In combination, a supporting structure having a pair of openings, a hollow molding having spaced inturned flanges disposed on one side of said structure over said openings, and a pair of oppositely arranged spring fasteners securing said molding upon said structure, each fastener including a head bearing against the other side of said structure and a holding part consisting of a shoulder sprung past one flange and an arm lapping the other flange and abutting a wall of the molding disposed transversely of said last named flange.

4. In combination, a supporting structure having a pair of openings, a hollow molding having spaced inturned flanges disposed on said structure over said moldings, and a pair of oppositely arranged spring fasteners securing said molding upon said structure, each fastener comprising a flat head bearing against the underside of the supporting structure, a shoulder sprung past one of the molding flanges, and an arm lapping the other molding flange and terminating against a wall of said molding extending transversely of said flanges.

5. In combination, a supporting structure having a pair of openings, a hollow molding having spaced inturned flanges disposed on said structure over said moldings, and a pair of oppositely arranged spring fasteners securing said molding upon said structure, each fastener comprising a wire loop bearing against the under side of the supporting structure, and a pair of spring arms extending through said openings, each arm providing a shoulder that may be sprung past one of the molding flanges, and a portion extending away from said shoulder into yielding contact with the inside of the other molding flange and terminating against a wall of said molding extending transversely to said flanges.

6. A wire spring fastener, consisting of a head in the form of an open loop, resilient arm portions extending away from the plane of said loop and forming holding shoulders spaced from said head and extending in one direction so as to form a recess with said head and further resilient arm portions carried by said first named portions and extending in substantial parallelism in the opposite direction from said shoulders.

7. A spring fastener for securing flanged moldings upon a supporting structure, comprising a flat head, and holding arms each consisting of a portion disposed at an angle to said head, a shoulder on said portion substantially spaced from and extending in one direction so as to form a recess with said head, and a long curved portion extending away from said shoulder in the opposite direction in spaced relation to said head, said last named portion and said head forming a hook to grip a flange of the molding and a part of said structure.

8. A spring fastener comprising a flat head, and holding means carried by said head eccentrically thereof, said holding means consisting in a resilient portion extending normal to said head and provided with a shoulder extending in one direction spaced from said head whereby a recess is formed between said head and shoulder and another elongated portion extending away from said shoulder in the opposite direction, said portion being also spaced from said head.

9. A wire spring fastener comprising a flat head in the form of an open loop, and holding means carried by said head and consisting in two parallel resilient arms projecting away from said head eccentrically thereof, each of said arms having a shoulder spaced from said head and extending in one direction so as to form a recess with said head and an elongated portion extending away from said shoulder in the opposite direction but spaced from the head to provide a hook-like formation between said head and said last named portion.

10. A spring fastener to secure two parts having aligned openings in juxtaposition by passage of the holding part of the fastener through said openings, consisting in a head shaped to bear upon one of said parts over a substantial area around the opening therein, and a holding part to extend eccentrically away from said head through said aligned openings, said holding part including a yieldable shoulder substantially spaced from said head and extending in one direction to form a recess with said head to receive the juxtaposed parts at one side of the opening therein and an arm extending away from said shoulder in the opposite direction to overlap said other part at the other side of said last named opening.

BION C. PLACE.